US008259601B2

(12) United States Patent
Fu

(10) Patent No.: US 8,259,601 B2
(45) Date of Patent: *Sep. 4, 2012

(54) INTERFERENCE MEASUREMENT MECHANISM FOR FREQUENCY REUSE IN CELLULAR OFDMA SYSTEMS

(75) Inventor: I-Kang Fu, Dashe Township, Kaohsiung County (TW)

(73) Assignee: MediaTek Inc. (TW)

( * ) Notice: Subject to any disclaimer, the term of this patent is extended or adjusted under 35 U.S.C. 154(b) by 54 days.

This patent is subject to a terminal disclaimer.

(21) Appl. No.: 12/287,925

(22) Filed: Oct. 15, 2008

(65) Prior Publication Data
US 2009/0092059 A1 Apr. 9, 2009

Related U.S. Application Data

(60) Provisional application No. 60/980,413, filed on Oct. 16, 2007.

(51) Int. Cl.
*H04L 12/26* (2006.01)
(52) U.S. Cl. .................. 370/252; 370/329; 455/450
(58) Field of Classification Search .......... 370/252, 370/255, 318, 319, 317, 344, 348; 455/450
See application file for complete search history.

(56) References Cited

U.S. PATENT DOCUMENTS

| | | | |
|---|---|---|---|
| 6,609,001 B2 * | 8/2003 | Kline et al. ............... | 455/423 |
| 7,423,991 B2 | 9/2008 | Cho et al. ................. | 370/329 |
| 2003/0045259 A1 | 3/2003 | Kimata .................... | 455/260 |
| 2004/0228270 A1 | 11/2004 | Chen et al. ............... | 370/210 |
| 2006/0227812 A1 | 10/2006 | Vrcelj et al. .............. | 370/503 |
| 2007/0091984 A1 | 4/2007 | Batra et al. ............... | 375/130 |
| 2007/0211757 A1 * | 9/2007 | Oyman .................... | 370/468 |
| 2007/0286064 A1 | 12/2007 | Yu et al. .................. | 370/204 |
| 2008/0068999 A1 | 3/2008 | Ishii et al. ................ | 370/235 |
| 2008/0253319 A1 * | 10/2008 | Ji et al. .................... | 370/328 |
| 2008/0260004 A1 | 10/2008 | Batra et al. ............... | 375/146 |
| 2008/0298326 A1 | 12/2008 | Pande et al. .............. | 370/336 |

(Continued)

FOREIGN PATENT DOCUMENTS

JP 1999511312 A 9/1999

(Continued)

OTHER PUBLICATIONS

S. Gummadi et al., "Support for Intercell Interference Mitigation," IEEE C802.16maint-08/109r7, Jun. 20, 2008.

(Continued)

*Primary Examiner* — Donald Mills
*Assistant Examiner* — Henry Baron
(74) *Attorney, Agent, or Firm* — Imperium Patent Works; Zheng Jin

(57) ABSTRACT

Under adaptive frequency reuse technique, mobile stations in a cellular orthogonal frequency division multiple access (OFDMA) system are served by different radio resource regions with appropriate frequency reuse patterns to mitigate inter-cell interference and improve system capacity. In a first novel aspect, the mobile stations measure interference statistics and obtain interference measurement results. The mobile stations report the obtained interference measurement results to serving base stations. The serving base stations determine adaptive frequency reuse patterns based on the received interference measurement result. In a second novel aspect, a radio resource control element receives the interference measurement results, determines frequency reuse patterns and configures radio resource allocation based on the received interference measurement results. In a third novel aspect, the base stations obtain the interference measurement results and schedule the mobile stations to be served with appropriate radio resource regions.

22 Claims, 12 Drawing Sheets

METHOD OF MEASURING INTERFERENCE STATISTIC FOR ADAPTIVE FREQUENCY REUSE IN OFDMA SYSTEMS

U.S. PATENT DOCUMENTS

| | | | |
|---|---|---|---|
| 2009/0017859 A1 | 1/2009 | Seppinen et al. | 455/522 |
| 2009/0291692 A1* | 11/2009 | Kazmi et al. | 455/452.2 |

FOREIGN PATENT DOCUMENTS

| | | |
|---|---|---|
| JP | 2005094672 A | 4/2005 |
| JP | 2007510385 A | 4/2007 |
| JP | 2007525926 A | 9/2007 |
| WO | WO2005101882 A1 | 10/2005 |
| WO | WO 2007/108769 A1 | 3/2006 |
| WO | WO2006069302 A1 | 6/2006 |
| WO | WO2007108077 A1 | 9/2007 |

OTHER PUBLICATIONS

C. Chen et al., "Adaptive Frequency Reuse in IEEE 802.16m," IEEE C802.16m-08/702r3, Jul. 15, 2008.

I-Kang Fu et al., "Harmonized SDD Text Proposal on Interference Mitigation by Link Rapporteur Group," IEEE C802.16m-08/1019r2, Sep. 18, 2008.

I-Kang Fu et al., "Inter-BS Coordination for Interference Management in IEEE 802.16m," IEEE C802.16m-08/317r4, May 15, 2008.

I-Kang Fu et al., "Classification on Interference Management Proposals in TGm," IEEE C802.16m-08/142r6, Mar. 20, 2008.

International Search Report and Written Opinion of International Search Authority for PCT/CN2008/072727 dated Feb. 5, 2009 (19 pages).

Office Action for U.S. Appl. No. 12/287,990, mailed on Nov. 28, 2011.

Office Action, for JP patent application 2010-529222, dated on Feb. 7, 2012 (3 pages).

Translation of Office Action for JP patent application 2010-529222 (3 pages).

* cited by examiner

METHOD OF MEASURING INTERFERENCE STATISTIC FOR
ADAPTIVE FREQUENCY REUSE IN OFDMA SYSTEMS

INTERFERENCE MEASUREMENT MECHANISM FOR FREQUENCY REUSE IN CELLULAR OFDMA SYSTEMS

CROSS REFERENCE TO RELATED APPLICATIONS

This application claims priority under 35 U.S.C. §119 from U.S. Provisional Application No. 60/980,413, entitled "A Measurement Mechanism for Adaptive Frequency Reuse in Cellular OFDMA Systems," filed on Oct. 16, 2007, the subject matter of which is incorporated herein by reference.

TECHNICAL FIELD

The present invention relates generally to cellular OFDMA systems and, more particularly, to interference measurement mechanism for adaptive frequency reuse.

BACKGROUND

In wireless mobile systems, frequency reuse is an important technique to improve the overall system capacity by reusing the scarce radio spectrum resource. Improvement of the system capacity, however, is achieved at the cost of link performance due to increased interference. In a cellular orthogonal frequency division multiple access (OFDMA) system, there is no intra-cell interference as users remain orthogonal. Reusing the radio spectrum, however, will result in inter-cell interference because the same frequency band is reused by base stations serving neighboring cells.

FIG. 1 (prior art) is a diagram that illustrates a cell structure of a cellular OFDMA system 1. Cellular OFDMA system 1 includes a cell structure having a frequency reuse factor 1/K equal to ¼. Frequency reuse factor 1/K represents the number of cells that cannot share the same frequency bands for transmission. In the example of FIG. 1, the entire licensed spectrum is partitioned into four frequency bands, and every four neighboring cells form a cluster of four cells, within which each cell is served by a different frequency band. In one example, base station BS4 and base station BS5 share the same frequency band #1 to serve mobile station MS6 located within cell 2 and to serve mobile station MS7 located within cell 3 respectively. As a result, when BS4 transmits a desired data signal to communicate with MS6, it also transmits an undesired interference signal to MS7. Such interference signal reduces the signal to interference-plus-noise ratio (SINR) of mobile station MS7 and thus reduces overall quality of service. Although a smaller frequency reuse factor 1/K generally results a larger separation (e.g., SQRT (3K)* R, where R is the cell radius) from interfering sources, the available radio resource in each cell becomes lower (e.g., 1/K of the licensed spectrum).

Other techniques such as fractional frequency reuse (FFR) have been proposed for cellular OFDMA systems to achieve a better tradeoff between system capacity and quality of service. FIG. 2 (prior art) is a diagram that illustrates FFR in a cellular OFDMA system 10. Cellular OFDMA system 10 includes a cell 11 that is partitioned into cell region 1 and cell region 2. Cell region 1 is located in a geographic area closer to serving base station BS12 while cell region 2 is located in a geographic area further to serving base station BS12. In addition, the radio spectrum of OFDMA system 10 is partitioned into a first frame zone and a second frame zone in time domain. Under adaptive frequency reuse technique, different frame zones are applied with different frequency reuse factors to serve mobile stations located in different cell regions. In the example of FIG. 2, the first frame zone has a higher frequency reuse factor of 1/K=1 to serve cell region 1 while the second frame zone has a lower frequency reuse factor of 1/K=⅓ to serve cell region 2. Mobile station MS17 located in cell region 1 is therefore served by BS12 through the first frame zone with 1/K=1, and mobile station MS18 located in cell region 2 is therefore served by BS12 through the second frame zone with 1/K=⅓. Because mobile station MS17 is located close to the center of cell 11, it is presumed to receive relatively strong data signals from BS12 and relatively weak interference signals from neighboring interfering sources. On the other hand, because mobile station MS18 is located close to the boundary of cell 11, it is presumed to receive relatively weak data signals from BS12 and relatively strong interference signals from neighboring interfering sources. Therefore, by serving MS1 using a higher reuse factor (1/K) and serving MS2 using a lower reuse factor (1/K), a good tradeoff between system capacity and quality of service is achieved.

Unfortunately, FFR technique based on geographic locations is not always effective. As illustrated in FIG. 2, a physical structure 14 is located between mobile station MS18 and an interfering base station BS13. Interfering base station BS13 thus transmits relatively strong interference signal 15 to MS17 and relatively weak interference signal 16 to MS18. Under the existing frequency reuse pattern based on cell regions illustrated above, MS17 located in cell region 1 suffers strong interference from BS13 and yet is served with a higher 1/K=1, while MS18 located in cell region 2 enjoys good quality of service and yet is served with a lower 1/K=⅓. Therefore, FFR technique based on geographic locations is not suitable under dynamic network conditions. There remains a challenge to be able to dynamically measure interference, determine frequency reuse patterns, and configure radio resource allocation such that link performance and system capacity in a wireless mobile system remain well balanced.

Interference measurement mechanisms have been addressed in various wireless mobile systems. For example, in traditional cellular FDMA (e.g. GSM) or CDMA systems, narrow band signals are transmitted and received by transceivers. Due to the narrowband characteristic, an FDMA system can only measure the signal power or interference over one single time-frequency region at a given time. Such FDMA system is not able to freely measure among different time-frequency regions because the RF center frequency of the FDMA system needs to be adjusted accordingly. In contrast, in an OFDMA system, wideband signals are transmitted and received by transceivers equipped with Fast Fourier Transfer (FFT) functionality. Such OFDMA system allows signals to be easily transmitted and received over any specific time-frequency region among wider channel bandwidth. Therefore, the transceivers of the OFDMA system can freely measure the signal power or interference over a time-frequency region different from the time-frequency region for data receiving without changing the RF center frequency. This is a distinct feature of OFDMA systems as compared to other traditional cellular FDMA or CDMA systems.

SUMMARY

Under adaptive frequency reuse technique, mobile stations in a cellular orthogonal frequency division multiple access (OFDMA) system are served by different radio resource regions with appropriate frequency reuse patterns to mitigate inter-cell interference and improve system capacity. In addition, adaptive frequency reuse is further coordinated with radio resource allocation, scheduling, power allocation, antenna configuration, and channelization format to more aggressively utilize system resource and jointly optimize system performance.

In a first novel aspect, the mobile stations measure interference statistics and obtain interference measurement results. A solicited, unsolicited or autonomous interference measurement mechanism may be used in measuring interference statistics. The interference measurement results may then be obtained from the interference statistics directly or calculated from the interference statistics indirectly. The interference measurement results may include an interference power, a signal to interference ratio (SIR), a signal to interference-plus-noise ratio (SINR), an index indicative of an interfering station, an index indicative of a preferred or non-preferred radio resource region, or other SIR/SINR derived form. In one embodiment, each mobile station measures its interference statistic over a designated time-frequency region while the serving base station does not transmit signal over the designated time-frequency region. In another embodiment, each mobile station measures its interference statistic over a designated time-frequency region while the serving base station transmit signal over the designated time-frequency region. The serving base station transmits signal over the designated time-frequency region where the serving base station and interfering base stations are transmitting signal over that region, and the mobile station distinguishes the signal transmitted by serving base station from the signal transmitted by the interfering base stations. The mobile stations then report the obtained interference measurement results to the serving base stations or a centralized network control element. The serving base stations or the control element determines adaptive frequency reuse patterns based on the received interference measurement results.

In a second novel aspect, adaptive frequency reuse in a cellular OFDMA system is achieved either by a centralized network control element or by inter-BS coordination among the base stations based on interference measurement results. In one embodiment, a radio resource control element receives the interference measurement results, determines frequency reuse patterns and configures radio resource allocation based on the received interference measurement results. In another embodiment, the base stations obtain the interference measurement results and communicate the interference measurement results among the neighboring base stations. The base stations then determine frequency reuse patterns and configure radio resource allocation based on the obtained interference measurement results through inter-BS coordination.

In a third novel aspect, a base station obtains an interference measurement result and schedules a mobile station to be served with a radio resource region with an appropriate frequency reuse pattern. In a downlink frequency reuse control, the base station receives the interference measurement results from the mobile stations. In an uplink frequency reuse control, the base station measures its interference statistic and obtains the interference measurement result. The base station then schedules the mobile station to be served with an appropriate radio resource region to optimize system performance.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
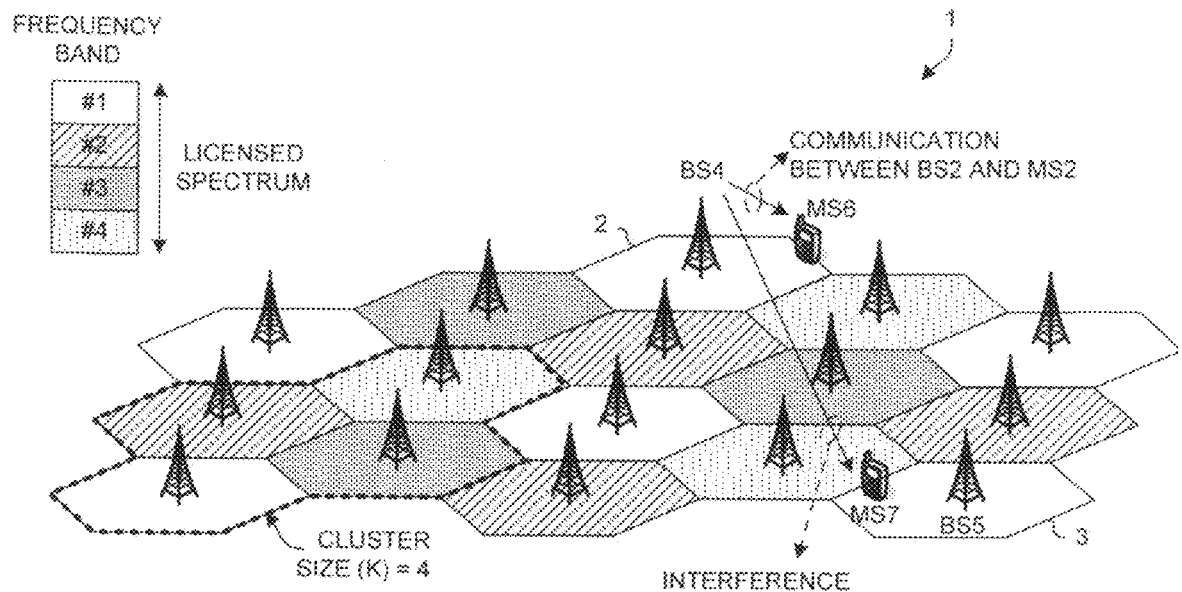
FIG. 1 (Prior Art) is a diagram illustrating a cell structure of a cellular OFDMA system.
Figure 2:
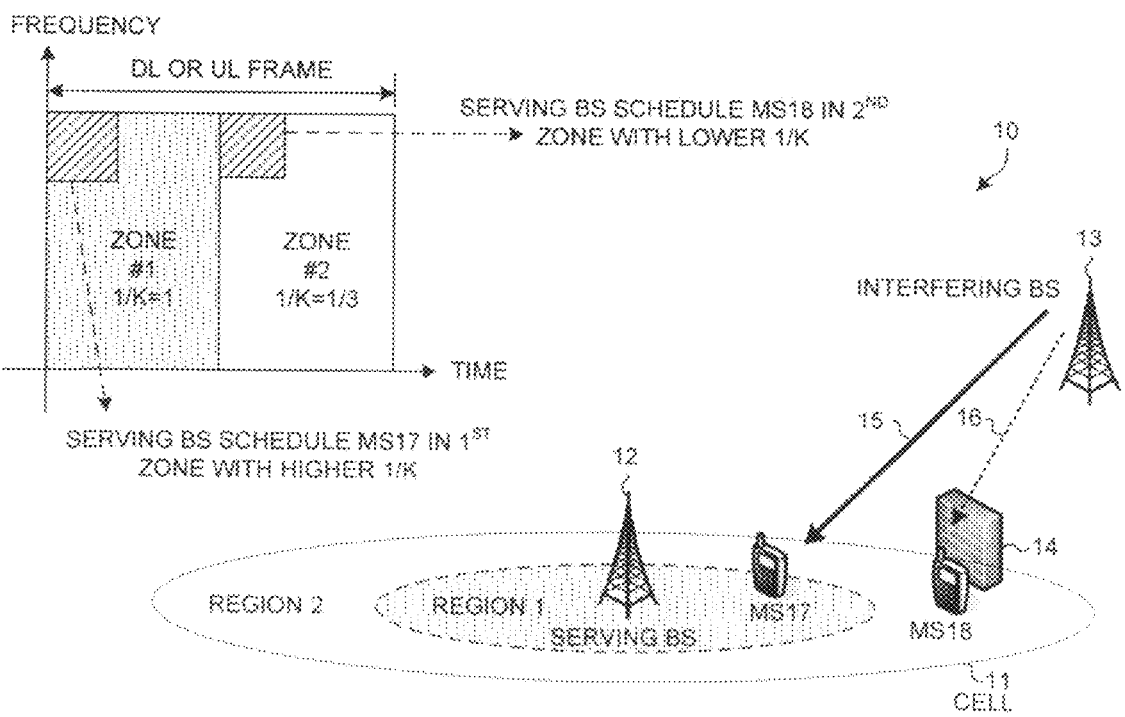
FIG. 2 (Prior Art) is a diagram illustrating fractional frequency reuse in a cellular OFDMA system.
Figure 3:
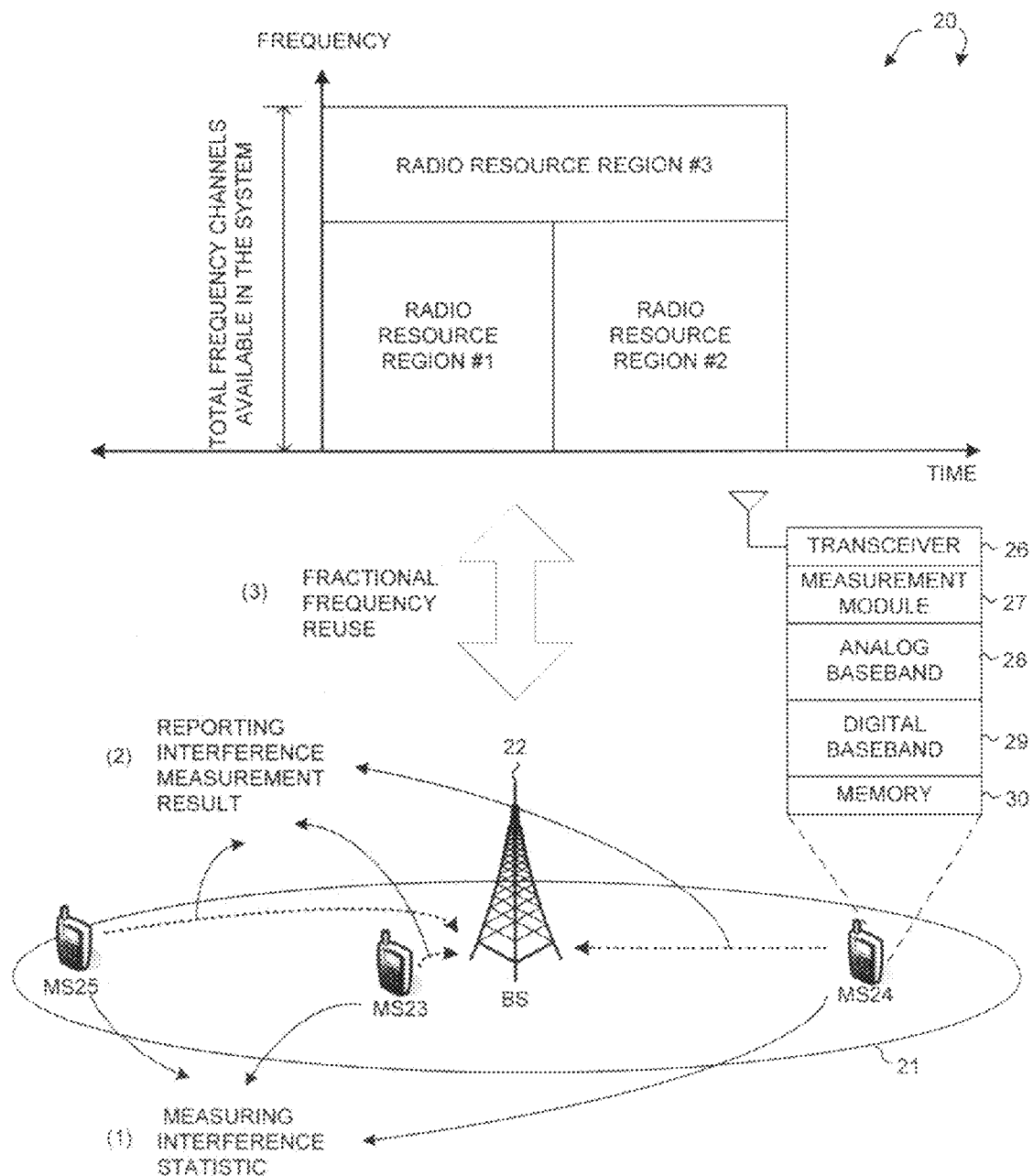
FIG. 3 is a diagram that illustrates a cellular OFDMA system in accordance with a first novel aspect.

FIG. 3 is a diagram that illustrates a cellular OFDMA system 20 in accordance with a first novel aspect. Cellular OFDMA system 20 includes a cell 21, a serving base station BS22, and a plurality of mobile stations including mobile stations MS23, MS24, and MS25 located in cell 21. Each mobile station includes a transceiver 26, a measurement module 27, an analog baseband circuitry 28, a digital baseband circuitry 29, and memory 30. Cellular OFDMA system 20 uses an adaptive frequency reuse (also referred as fractional frequency reuse (FFR)) technique to mitigate inter-cell interference. In the example of FIG. 3, the total frequency channels available in OFDMA system 20 are partitioned into three different radio resource regions #1, #2 and #3. The radio resource regions are partitioned either in time domain, or in frequency domain, or in a combination of both time domain and frequency domain. Each radio frequency region is applied with a corresponding frequency reuse factor to serve mobile stations located in cell 21. In accordance with the first novel aspect, each mobile station located in cell 21 is served by an appropriate frequency reuse factor based on interference measurement results obtained by each mobile station. As illustrated in FIG. 3, for downlink FFR control, each mobile station first measures its interference statistic and obtains an interference measurement result over a designated time-frequency region. The interference statistic may be represented in a form of an interference power, a signal to interference ratio (SIR), a signal to interference-plus-noise ratio (SINR), or some other interference information. The interference measurement result can either be obtained from the interference statistic directly or be calculated from the interference statistic indirectly. For example, the interference measurement result may be represented in a form of an interference power, a SIR, a SINR, an index indicative of an interfering station, an index indicative of a preferred or non-preferred radio resource region, or other SIR/SINR derived form. Each mobile station then reports the interference measurement result to serving base station BS22. Based on the received interference measurement results, serving base station BS22 schedules each mobile station to be served by a corresponding radio resource region with an appropriate radio resource region to optimize link performance while maximize system capacity.

Figure 4:
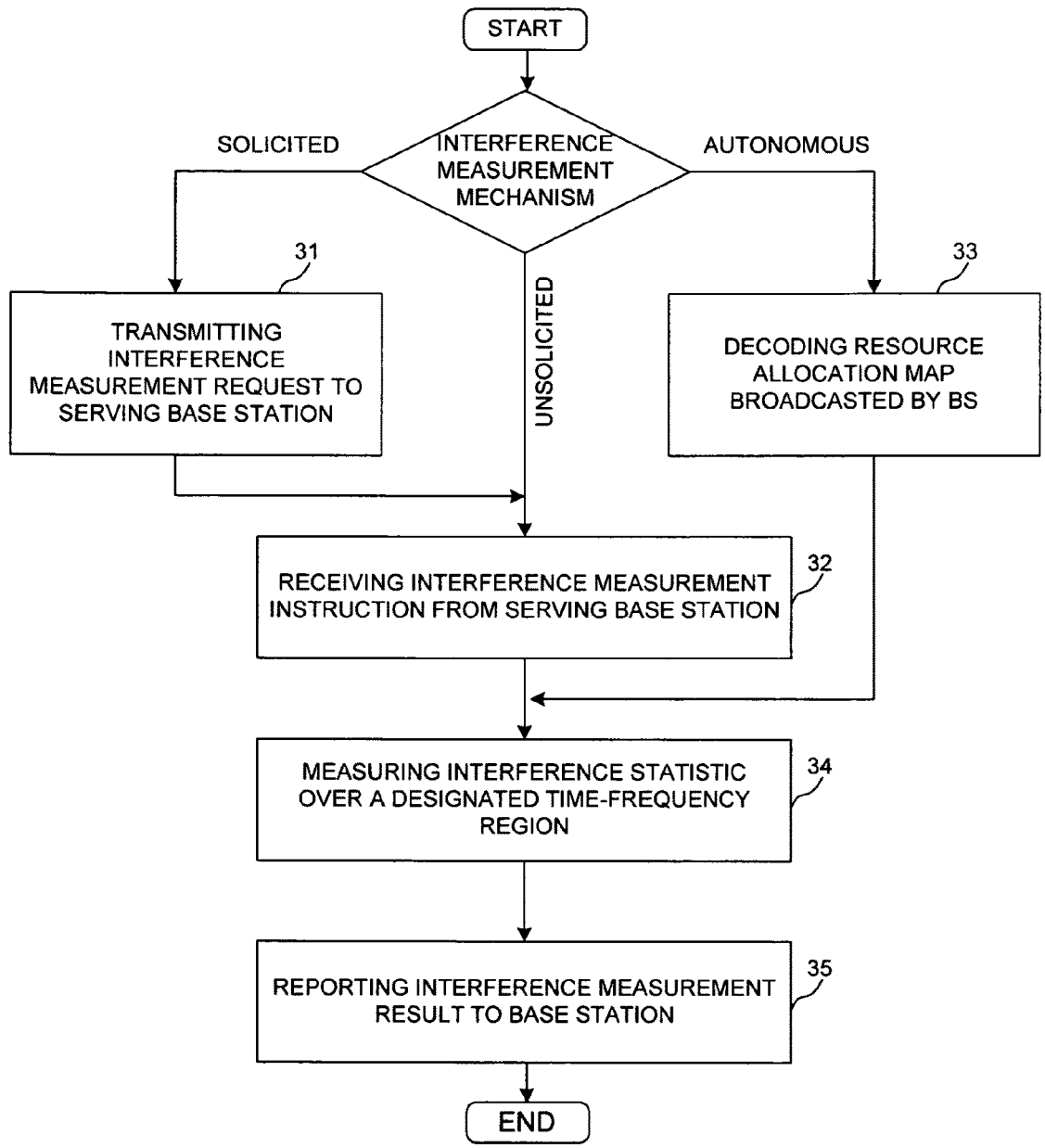
FIG. 4 is a flow chart of measuring interference statistics and reporting interference measurement result in a cellular OFDMA system.

FIG. 4 is a flow chart of measuring interference statistics and reporting interference measurement results in a cellular OFDMA system. There are different interference measurement mechanisms. Under a solicited interference measurement mechanism, a mobile station first transmits an interference measurement request to a serving base station (step 31). After the solicitation, the mobile station then receives an interference measurement instruction from the serving base station (step 32). In step 34, the mobile station measures its interference statistic over a designated time-frequency region and thereby obtains an interference measurement result. The designated time-frequency region is provided by the interference measurement instruction. In the final step of step 35, the mobile station reports the interference measurement result to the serving base station. Under an unsolicited interference measurement mechanism, the mobile station does not transmit the interference measurement request. Instead, the serving base station instructs the mobile station to perform interference measurement directly. The mobile station then follows the same steps of 34 and 35 to measure its interference statistic and report the interference measurement result to the serving base station. Under an autonomous interference measurement mechanism, there is neither interference measurement request nor interference measurement instruction communicated between the mobile station and the serving base station. Instead, the mobile station receives a resource allocation MAP broadcasted by the serving base station. By decoding the resource allocation MAP, the mobile station obtains the designated time-frequency region which can be used to perform interference measurement. The mobile station then follows the same steps of 34 and 35 to measure its interference statistic and report the interference measurement result to the serving base station.

Figure 5:
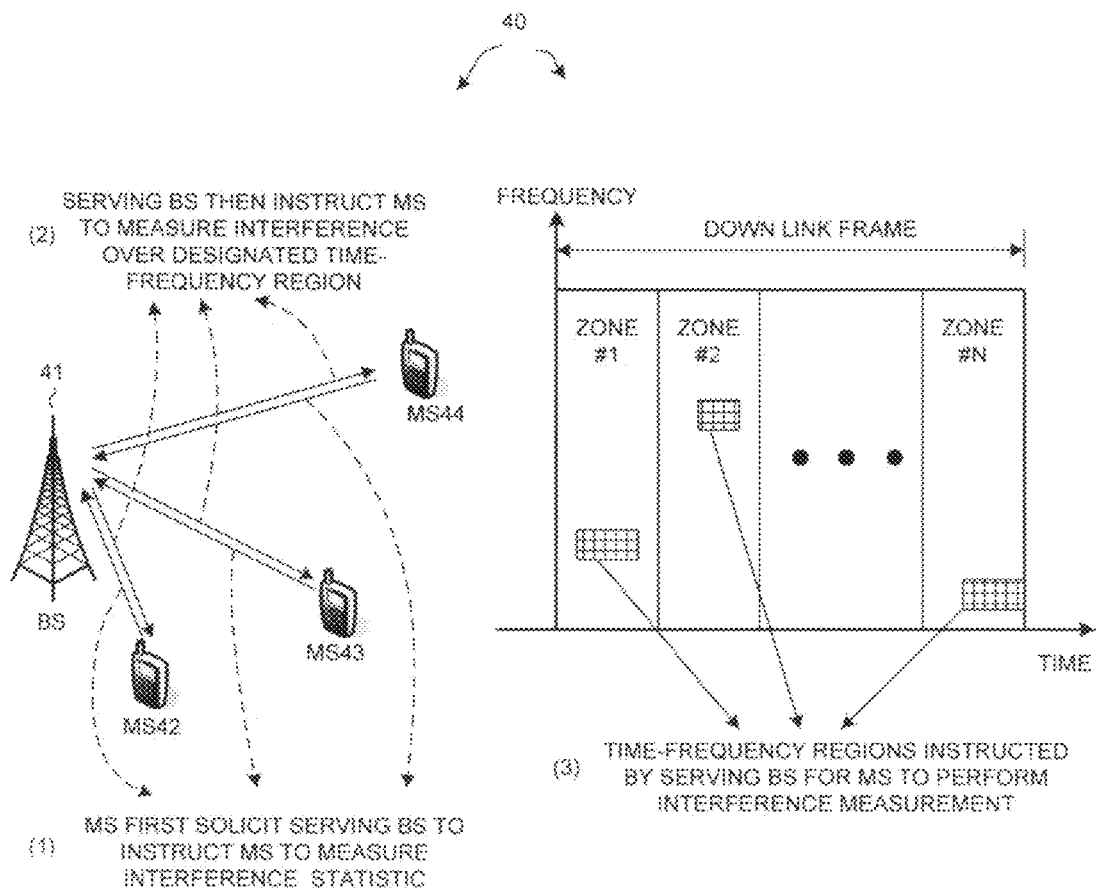
FIG. 5 is a diagram that illustrates a solicited or unsolicited interference measurement mechanism.

FIG. 5 is a diagram that illustrates a solicited or an unsolicited interference measurement mechanism used in cell 40 of a cellular OFDMA system. Mobile stations MS42, MS43, and MS44 are located in cell 40 that is served by a serving base station BS41. In the example of FIG. 5, a downlink (DL) frame of cell 40 is divided into N different frame zones (ZONE #1-#N) in time domain. Under a solicited interference measurement mechanism, mobile stations MS42, MS43 and MS44 first solicit serving base station BS41 to instruct the mobile stations to measure their interference statistics. After serving base station BS41 receives such solicitation, it instructs each mobile station to perform interference measurement over a designated time-frequency region within each frame zone. Under an unsolicited interference measurement mechanism, serving base station BS41 initiates the interference measurement directly without receiving solicitation from the mobile stations.

In one embodiment, the mobile stations are unable to distinguish whether the received signal is from the serving base station or from other interfering stations. To facilitate interference measurement for the mobile stations, serving base station BS41 does not transmit data signal over the designated time-frequency region. As a result, the total signal power received by each mobile station over the designated time-frequency region is equivalent to total received interference power and therefore is easily measurable. In another embodiment, the mobile stations are able to distinguish interference signals from data signals and thus are able to measure and calculate total received interference power, SIR, or SINR. For example, in a wireless communication system such as WiMAX, the pilot signal transmitted by each base station is encoded with a unique code. Therefore, the mobile stations can use the received pilot power from its serving base station to derive the received interference power from interfering base stations.

Figure 6:
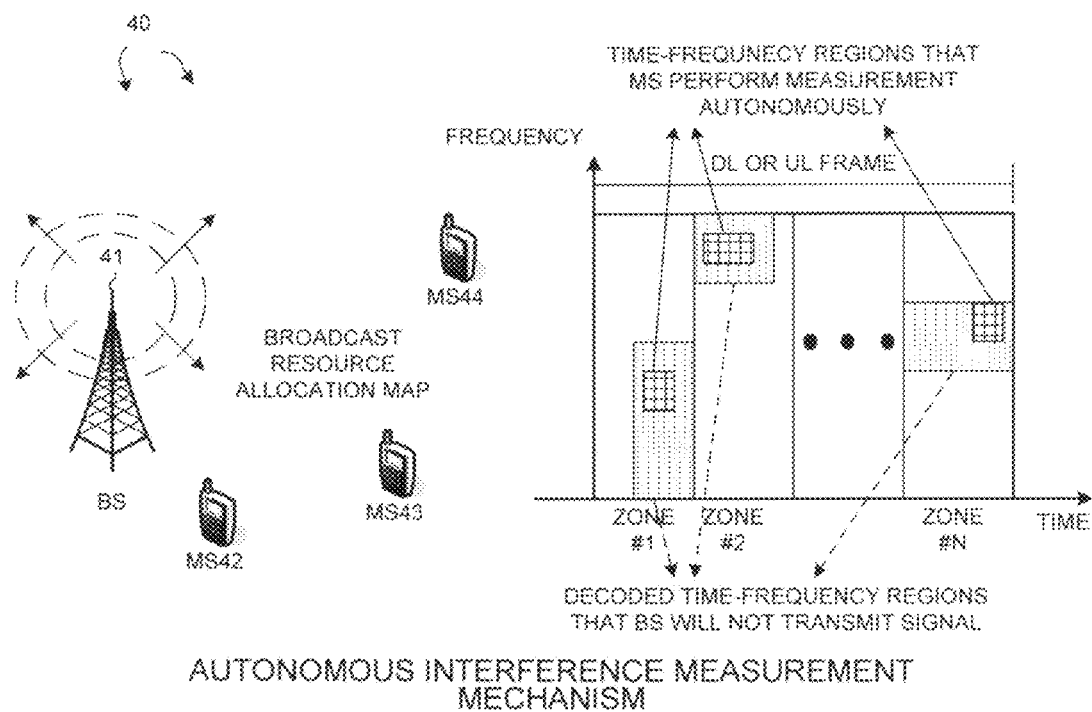
FIG. 6 is a diagram that illustrates an autonomous interference measurement mechanism.

FIG. 6 is a diagram that illustrates an autonomous interference measurement mechanism used in cell 40 of a cellular OFDMA system. Serving base station BS41 periodically broadcasts resource allocation MAP to all mobile stations located in cell 40. In one embodiment, mobile stations MS42, MS43, and MS44 decode the resource allocation MAP to obtain a decoded time-frequency region within each frame zone that serving base station BS22 does not transmit signal. Each mobile station then allocates a designated time-frequency region within each frame zone to perform interference measurement autonomously. For example, the designated time-frequency region is a subset of the decoded time-frequency region over which serving base station BS41 does not transmit signal. In another embodiment (not illustrated in FIG. 6), each mobile makes recommendation to serving base station BS41 on which time-frequency region should be designated to perform interference measurement.

There are various means in using a measurement module to measure an interference statistic of a mobile station in a cellular OFDMA system. In the present invention, the measurement module (for instance, measurement module 27 in FIG. 3) may be a piece of programmable or non-programmable hardware or software embedded within the mobile station for measuring the interference statistics.

Figure 7:
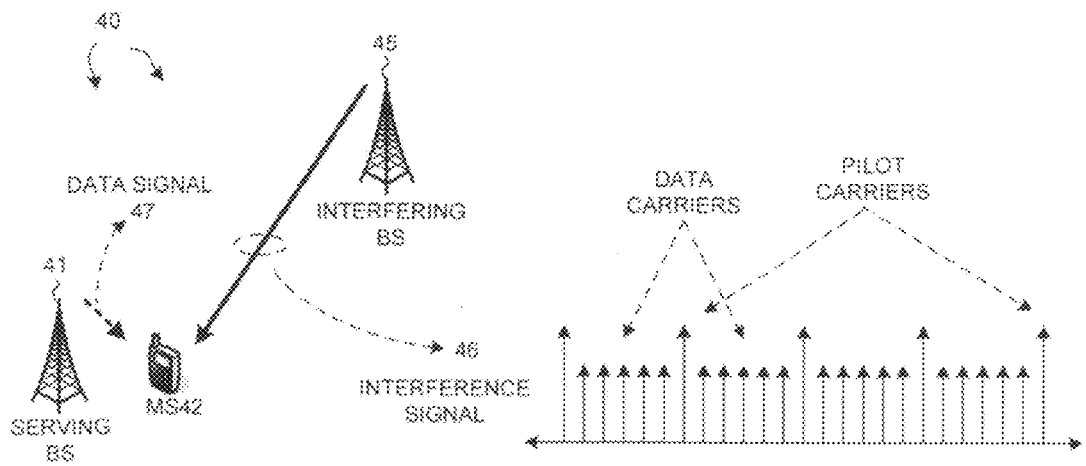
FIG. 7 is a diagram that illustrates examples of measuring interference statistics.

FIG. 7 is a diagram that illustrates various examples of measuring an interference statistic of mobile station MS42 located in cell 40 of a cellular OFDMA system. In the example of FIG. 7, mobile station MS42 is served by serving base station BS41, and is within the reach of a nearby interfering station BS45. As illustrated in FIG. 7, if mobile station MS42 is able to distinguish data signals from interference signals, then serving base station BS41 transmits data signal 47 to MS42 while interfering station BS45 transmits an interference signal 46 to MS42. In a first example, mobile station MS42 obtains the interference power by measuring a reference signal power (e.g., a pilot signal power) of each base stations and the reference signal power is proportional to the total received signal power. In a second example, mobile station MS42 receives interference signal 46 and identifies a preceding matrix index (PMI) used by interfering station BS45. In a third example, mobile station MS42 distinguishes data signal 47 from interference signal 46 and measures a signal to interference ratio (SIR) or a signal to interference-plus-noise ratio (SINR) received by MS42.

After the mobile station measures a selected form of the interference statistics, it then obtains an interference measurement result accordingly. The interference measurement result may be the same as the measured interference statistics. The interference measurement result may also be calculated from the interference statistics indirectly. In one embodiment, the interference measurement result is represented by an index value that identifies an interfering base station. If a mobile station is able to identify the signal of a specific interfering base station from total received interfering signals, then it reports an index associated with at least one interfering station having the most significant interference. For example, the index is associated with the strongest SINR, the lowest interference power, or other interference information. The specific interfering base station is selected among all of interfering base stations (excluding the serving base station) by the mobile station. Typically, the specific interfering base station is selected by the mobile station. In some situations, however, the serving base station is capable of instructing the mobile station to report the specific interfering base station.

In another embodiment, the interference measurement result is represented by an index value that identifies a preferred or non-preferred radio resource region calculated based on the measured interference statistics. Because the interference statistics of the mobile stations in different time-frequency regions may be much different, the mobile stations are able to gather different interference statistics by repeating the interference measurement over different time-frequency regions. After gathering interference statistics over different time-frequency regions, the mobile stations are able to select an index that identifies a preferred or non-preferred radio resource region. For example, the preferred radio resource region is identified by either the highest SINR or the lowest interference power, and the non-preferred radio resource region is identified by either the lowest SINR or the highest interference power.

The interference measurement results obtained from actual interference measurement by the mobile stations reflect dynamic network conditions and are more accurate than an interference power estimated from geographic locations or measured from preamble. Therefore, based on the accurate interference measurement results, the serving base stations or other network elements (such as a network operator, a network controller, or other similar elements) are able to apply adaptive frequency reuse more effectively to meet much higher system capacity requirement for next generation 4G mobile communication systems.

In a second novel aspect, mobile communication systems use adaptive frequency reuse technique to optimize link performance and improve system capacity based on interference measurement results. Adaptive frequency reuse is specifically suitable for cellular OFDMA systems because of its flexibility in allocating time-frequency resource to different cells. Under adaptive frequency reuse technique, mobile stations are scheduled to be served by different radio resource regions with appropriate frequency reuse patterns. In addition, adaptive frequency reuse is further coordinated with radio resource allocation, scheduling, power allocation, antenna configuration, and channelization format to more aggressively utilize system resource and joint optimize system performance. In a cellular OFDMA system, adaptive frequency reuse is achieved either by a centralized network control element or by inter-BS coordination among the base stations.

Figure 8:
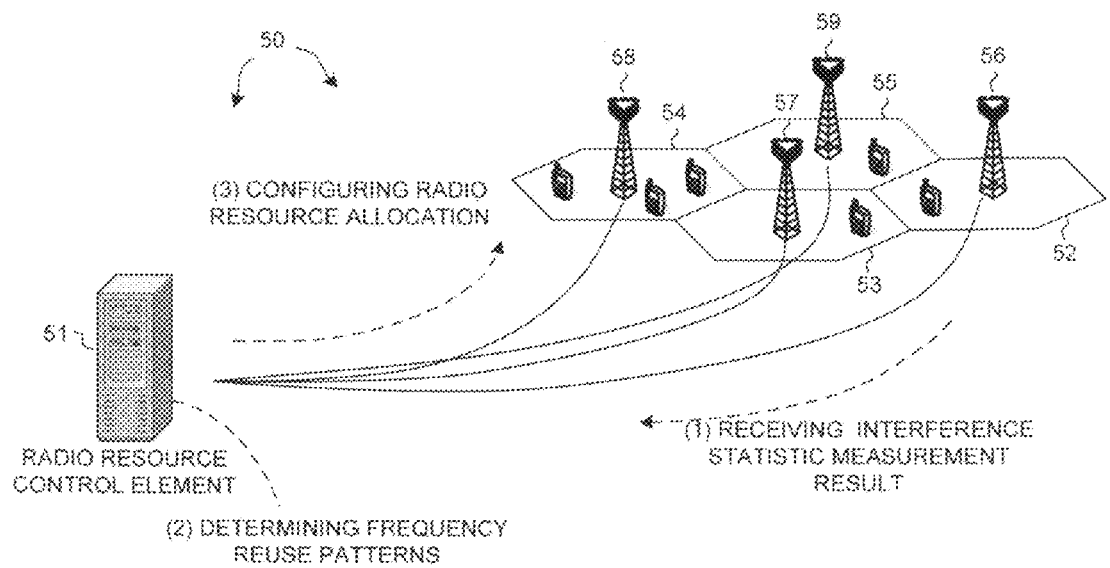
FIG. 8 is a diagram that illustrates a first embodiment of a cellular OFDMA system in accordance with a second novel aspect.

FIG. 8 is a diagram that illustrates a first embodiment of a cellular OFDMA system 50 in accordance with the second novel aspect. Cellular OFDMA system 50 includes a centralized radio resource control element 51, a plurality of cells including cells 52-55, a plurality of serving base stations including BS56-59, and a plurality of mobile stations. In the example of FIG. 8, radio resource control element 51 first receives interference measurement results from base stations BS56-59 (or from the mobile stations directly). Radio resource control element 51 then determines frequency reuse patterns based on the received interference measurement results and other network configuration parameters.

Figure 9:
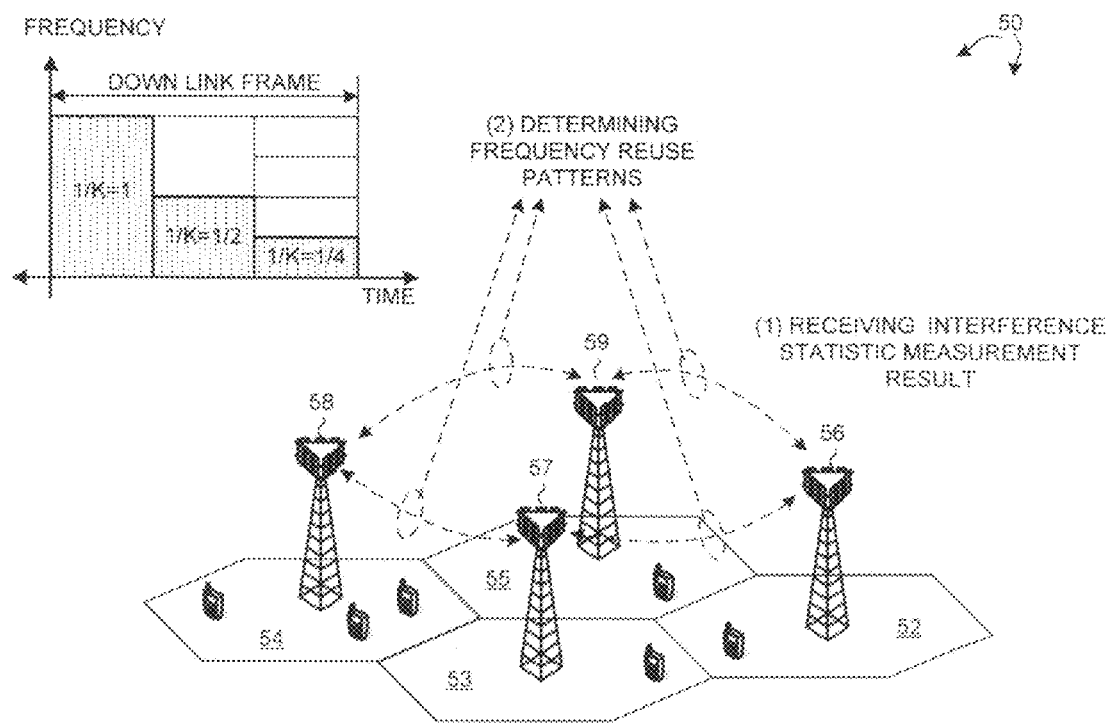
FIG. 9 is a diagram that illustrates a second embodiment of a cellular OFDMA system in accordance with the second novel aspect.

FIG. 9 is a diagram that illustrates a second embodiment of a cellular OFDMA system 50 in accordance with the second novel aspect. In the example of FIG. 9, serving base stations BS56-59 first receive interference measurement results from the mobile stations. Serving base stations BS56-59 then communicate with each other to determine frequency reuse patterns based on the received interference measurement and other network configuration parameters. In one example, a downlink frame of cell 54 is partitioned into three radio resource regions with frequency reuse factors (1/K) equal to 1, ½, and ¼ respectively to serve the three mobile stations located in cell 54.

Figure 10:
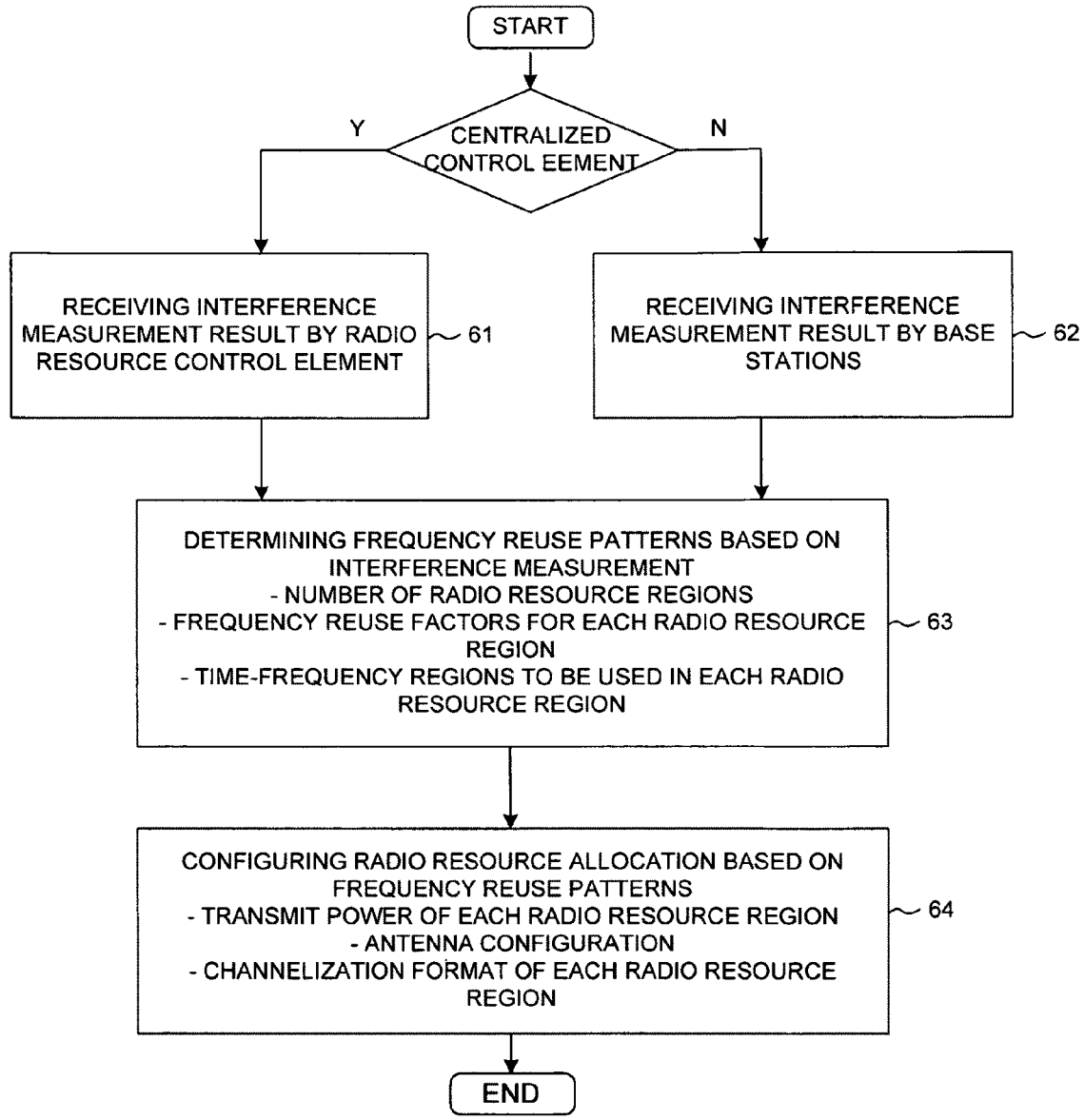
FIG. 10 is a flow chart of determining frequency reuse pattern and configuring radio resource allocation based on interference measurement results.

FIG. 10 is a flow chart of applying adaptive frequency reuse of a cellular OFDMA system in accordance with the second novel aspect. If cellular OFDMA system has a centralized radio resource control element, then the radio resource control element receives interference measurement results from the serving base stations (step 61). On the other hand, if no centralized control element is available, then the serving base stations receive interference measurement results from the mobile stations (step 62). In step 63, either the radio resource control element or the serving base stations determine frequency reuse patterns based on the received interference measurement results. More specifically, the following terms may be determined: the number of radio resource regions to be partitioned for each cell, frequency reuse factors to be applied with each radio resource region, and time-frequency regions to be used in each radio resource region. In step 64, either the radio resource control element or the serving base stations configure radio resource allocation based on the determined frequency reuse patterns. More specifically, the following terms may be determined: the transmit power of each radio resource region, the antenna configuration (e.g., beam pattern, preceding vector) of each radio resource region, and the channelization format (e.g., permutation rule over multiple cells) of each radio resource region.

To facilitate the determination of frequency reuse patterns, mobile stations measure their interference statistics over different radio resource region associated with a corresponding frequency reuse factor. In one embodiment, each mobile station measures its received interference power or SINR over different radio resource regions and then reports the measured interference power or SINR to its serving base station. The radio resource control element receives the measured interference power or SINR and then determines frequency reuse patterns based on the number of mobile stations located in each cell and based on the interference power or SINR of each mobile station over different radio resource regions. In one example, frequency reuse patterns are determined such that either an average interference power is minimized or the interference power of each mobile station is compared with a predetermined threshold (e.g. the interference power of each mobile station is smaller than a predetermined threshold value). In another example, frequency reuse patterns are determined such that either an average SINR is maximized or the SINR of each mobile station is compared with a predetermined threshold value (e.g. the SINR of each mobile station is larger than a predetermined threshold value).

Figure 11:
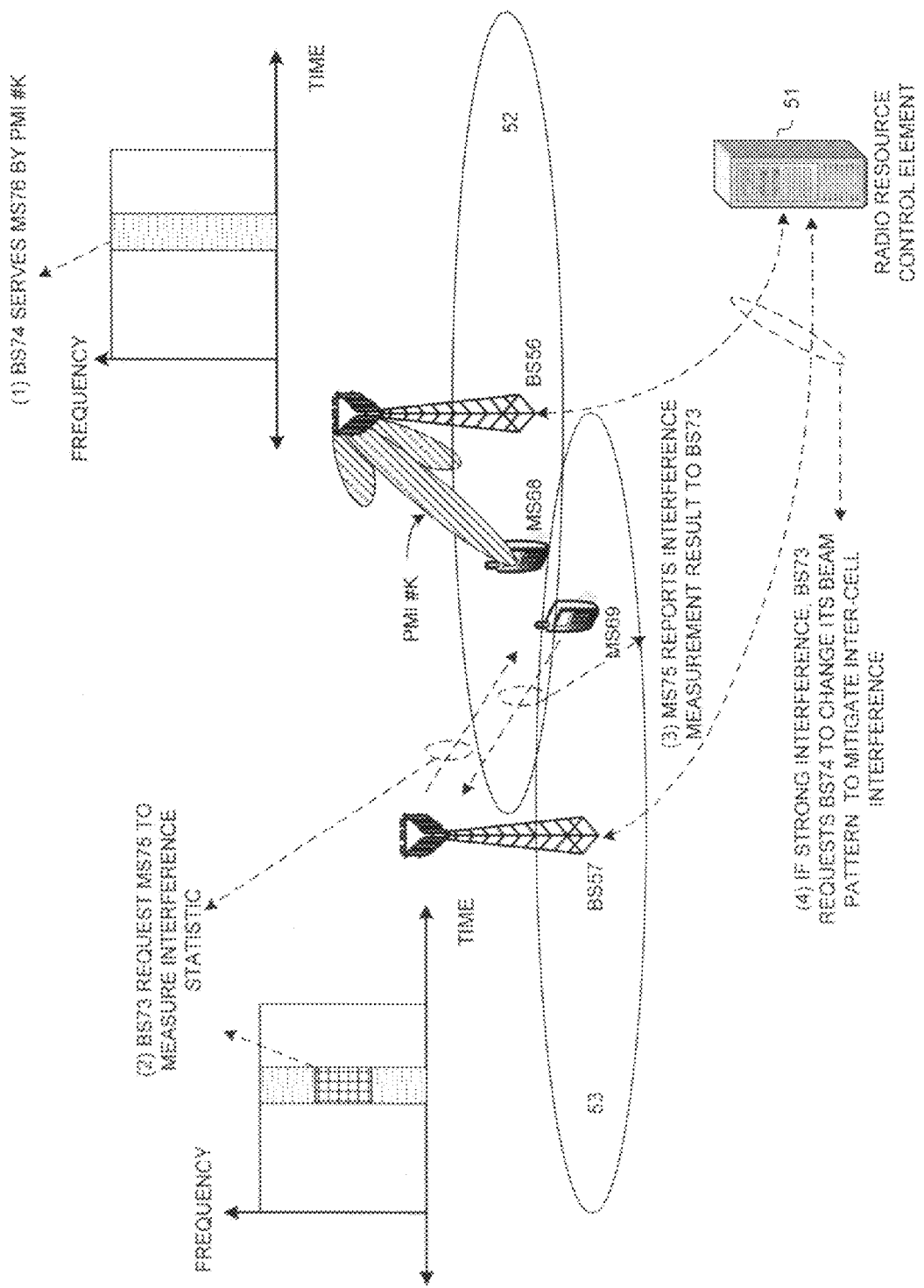
FIG. 11 is a diagram that illustrates one embodiment of determining antenna configuration based on interference measurement results.

FIG. 11 is a diagram that illustrates one embodiment of determining antenna configuration based on received interference measurement results in cellular OFDMA system 50.

In the example of FIG. 11, base station BS56 originally serves mobile station MS68 by precoding matrix index (PMI) #k. Under adaptive frequency reuse technique in accordance with the second novel aspect, mobile station MS69 performs the measurement and reports an interference measurement result (for instance, the PMI index #k used by interfering station BS56) to its serving base station BS57. Base station BS57 then communicates the interference measurement result to radio resource control element 51. Because mobile station MS69 is closely located to MS68, MS69 suffers strong interference due to PMI #K used by interfering station BS56. As a result, base station BS57 requests BS56 to change its beam pattern in order to mitigate such strong interference through radio resource control element 51.

Figure 12:
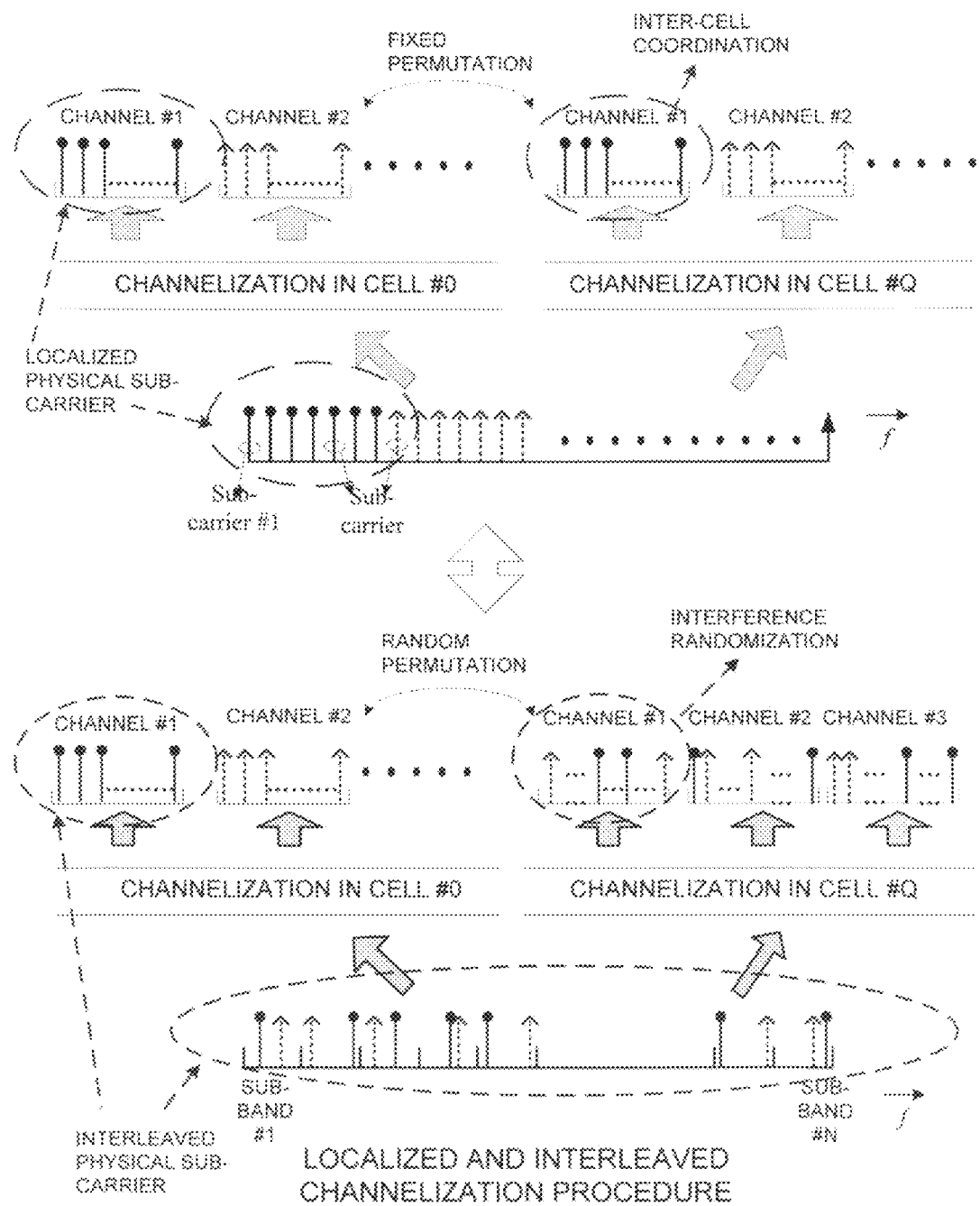
FIG. 12 is a diagram that illustrates one embodiment of determining channelization format based on interference measurement results.

FIG. 12 is a diagram that illustrates one embodiment of determining channelization format based on received interference measurement results in cellular OFDMA system 50. In a localized channelization procedure, the physical sub-carrier of each logical channel is distributed over a localized region in frequency domain. The sub-carrier permutation for channelization in different cells remains the same. As a result, interference from a specific interfering source could be very significant. In an interleaved channelization procedure, the physical sub-carrier of each logical channel is interleaved in frequency domain. The sub-carrier permutation for the channelization in different cells is different in pseudo random manner. As a result, interference from any specific interfering source is randomized. Typically, radio resource control element 51 is able to coordinate inter-cell interference using localized channelization method. However, if the interference is too dynamic to be coordinated, then the serving base stations simply randomize all the signals transmitted over specific radio resource region to achieve the effect of interference randomization using interleaved channelization method. Interference measurement result helps the cellular OFDMA system to apply different channelization methods or mixed channelization methods to mitigate inter-cell interference.

Figure 13:
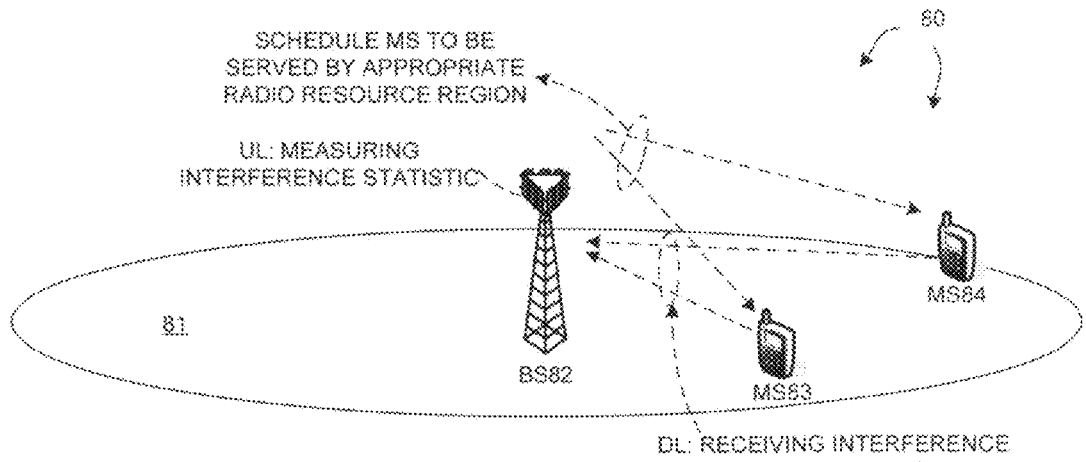
FIG. 13 is a diagram that illustrates a cellular OFDMA system in accordance with a third novel aspect.

FIG. 13 is a diagram that illustrates a cellular OFDMA system 80 in accordance with a third novel aspect. Cellular OFDMA system 80 includes a cell 81, a serving base station BS82 that serves cell 81, and mobile stations MS83 and MS84 that are located in cell 81. In accordance with the third novel aspect, serving base station BS82 either receives interference measurement results from mobile stations for downlink FFR control or measures interference statistics itself for uplink FFR control. Serving base stations BS82 then schedules the mobile stations to be served by appropriate radio frequency regions based on the interference measurement results.

Figure 14:
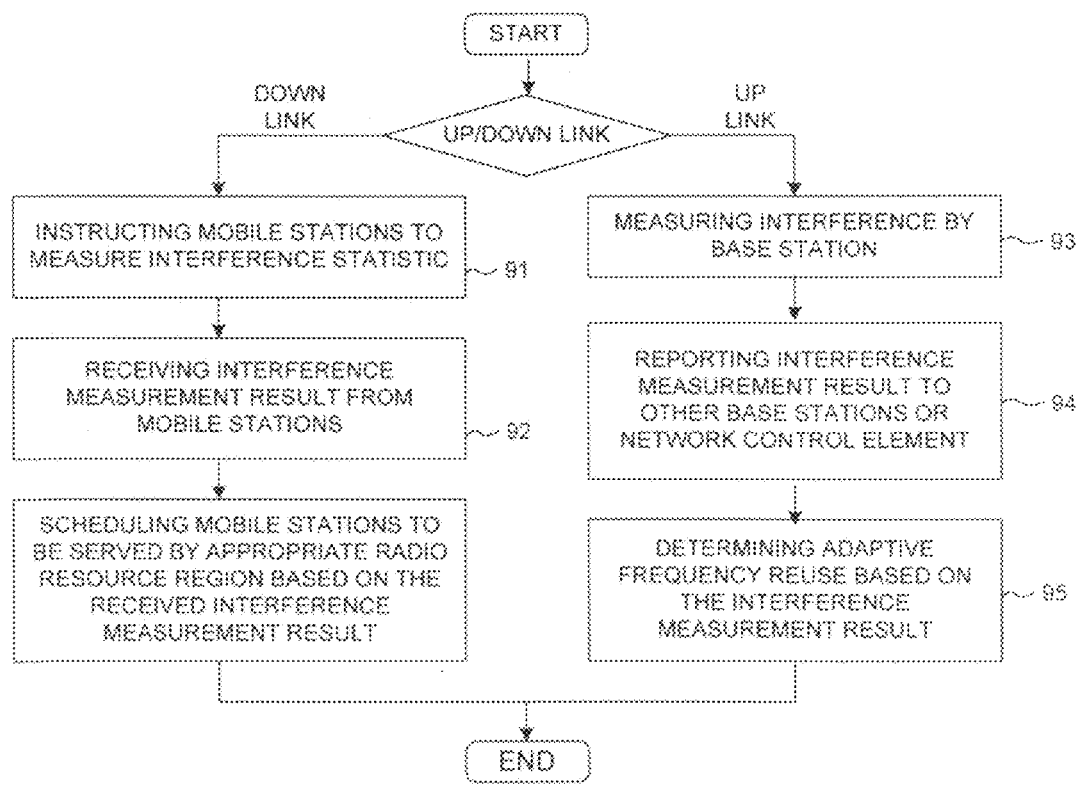
FIG. 14 is a flow chart of scheduling mobile stations based on interference measurement results.

FIG. 14 is a flow chart of scheduling mobile stations to be served by appropriate radio resource region based on interference measurement results. In downlink FFR control, the serving base station instructs each mobile station to measure its interference statistic over a designated time-frequency region under different radio resource regions (step 91). In step 92, the serving mobile station receives the interference measurement result from each mobile station. In step 95, the serving mobile station schedules each mobile station to be served by an appropriate radio resource region under a corresponding frequency reuse factor such that network performance is optimized. In uplink FFR control, the serving base station measures its own interference statistic (step 93). In step 94, the serving base station communicates the interference measurement results to other base stations or to another centralized network control element. In step 95, adaptive frequency reuse patterns are determined by the serving base station alone or through inter-BS coordination based on the interference measurement results.

Figure 15:
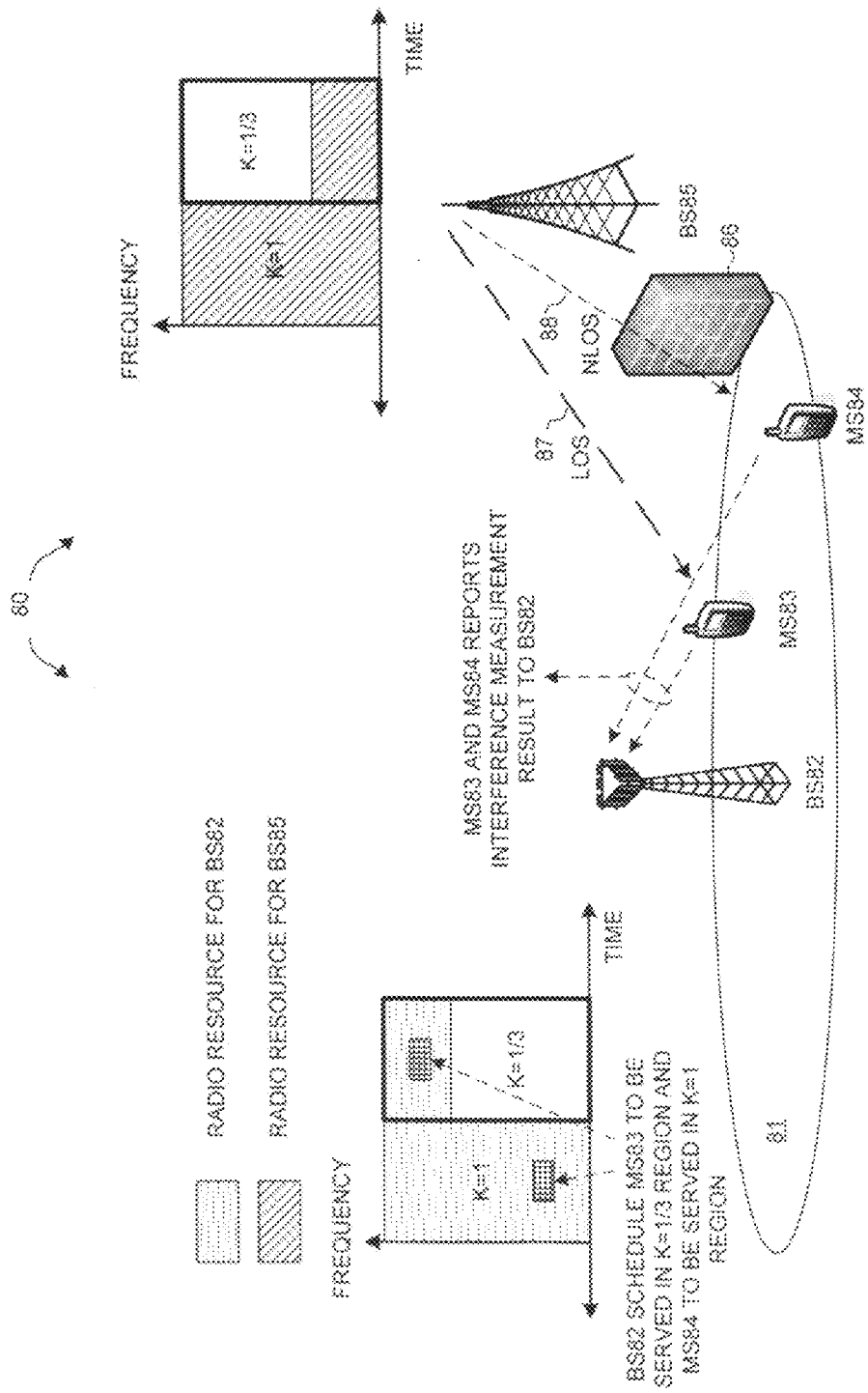
FIG. 15 is a diagram that illustrates an example of scheduling mobile stations based on interference measurement results.

FIG. 15 is a diagram that illustrates an example of scheduling mobile stations based on interference measurement results in cellular OFDMA system 80. Cellular OFDMA system 80 includes an interfering base station BS85 that serves a neighboring cell 81. In the example of FIG. 15, a physical structure 86 is located between mobile station MS84 and interfering base station BS85. If MS83 is served by a high frequency reuse factor (1/K=1) and MS84 is served by a low frequency reuse factor (1/K=⅓), then MS83 receives a strong interference signal 87 from interfering station BS85 and MS84 receives no interfering signal. On the other hand, if MS83 is served by a low frequency reuse factor (1/K=⅓) and MS84 is served by a high frequency reuse factor (1/K=1), then MS83 receives no interference signal from interfering station BS85 and MS84 receives a weak interference signal 88 that is blocked by physical structure 86. Therefore, based on the interference measurement results reported to serving base station BS82, BS82 schedules MS83 to be served in a radio resource region having frequency reuse factor 1/K equal to ⅓, and schedules MS84 to be served in a radio resource region having frequency reuse factor 1/K equal to 1. By determining frequency reuse patterns dynamically based on interference measurement results of each mobile station, radio resource is allocated to achieve a good balance between high system capacity and good quality of service.

Figure 16A:
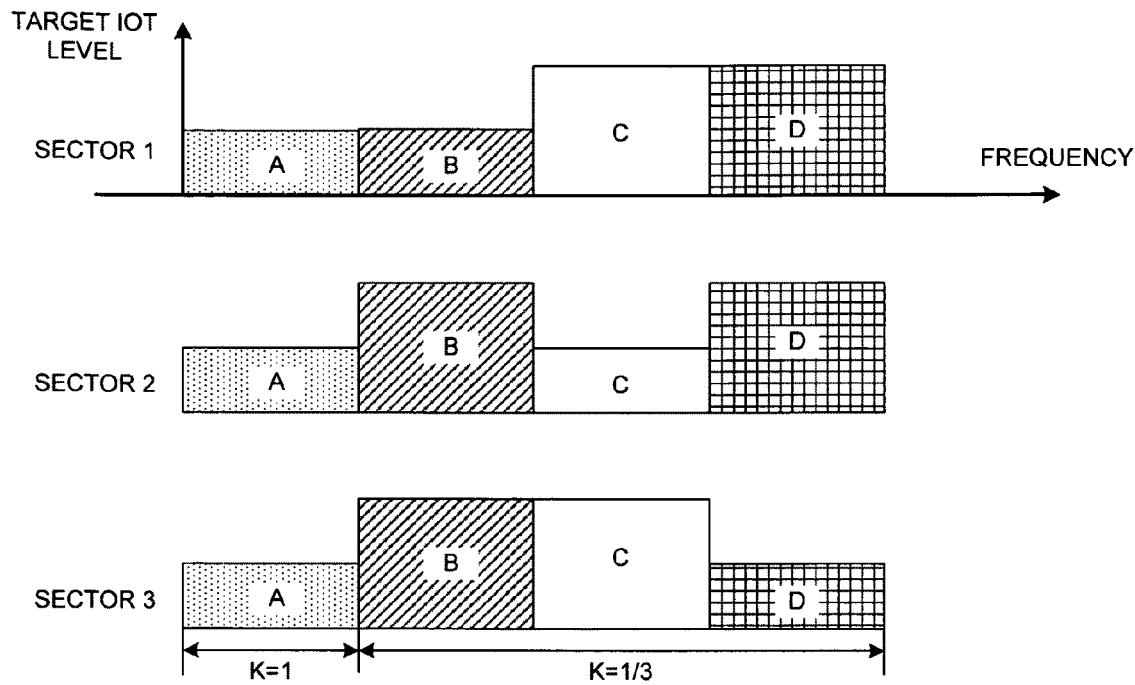
FIGS. 16A and 16B illustrate examples of applying fractional frequency reuse together with uplink power control.
Figure 16B:
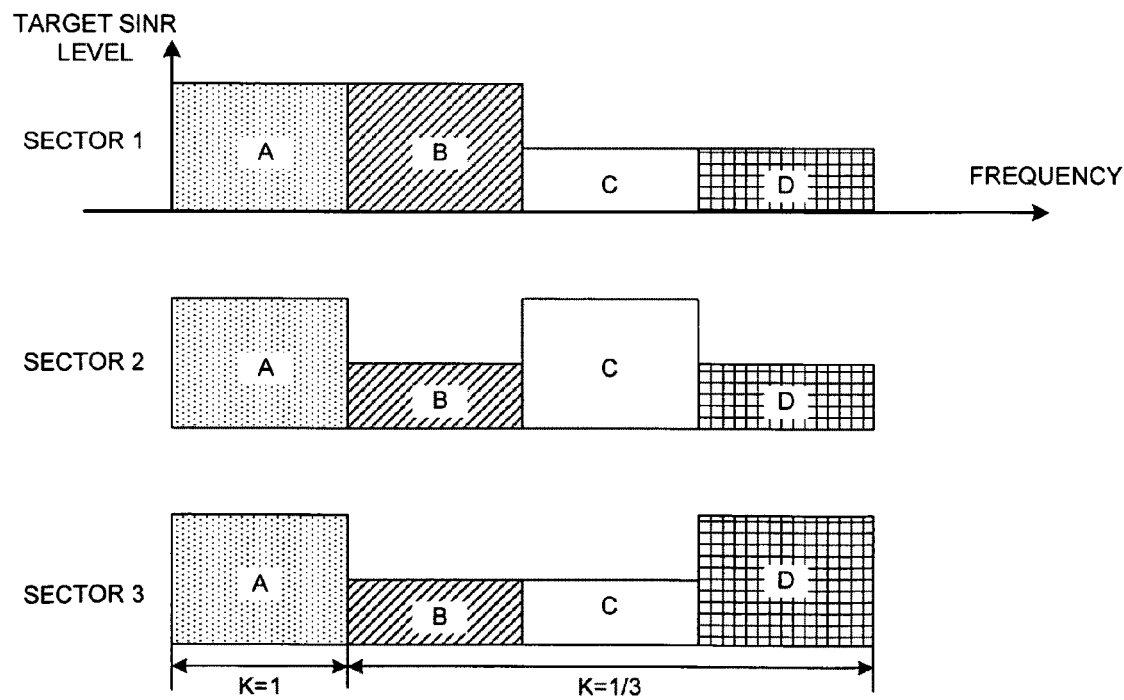

FIG. 16A is a diagram that illustrates an example of applying adaptive frequency reuse together with uplink power control through inter-BS coordination based on the interference measurement results. If the target interference over thermal (IoT) level of other cells for a radio resource region is low, then a mobile station assigned for that radio resource region is instructed to transmit with low power not to interfere other cell users. On the other hand, if the target IoT level of other cells for a radio resource region is high, then a mobile station assigned for that radio resource region is allowed to transmit with a higher power. To control system-wide interference, the serving base station adjusts the radio resource partitions and the corresponding target IoT level in coordination with other base stations. Similarly, FIG. 16B is a diagram that illustrates an example for SINR based uplink power control where different target SINR level is designated for different radio resource regions.

Although the present invention has been described in connection with certain specific embodiments for instructional purposes, the present invention is not limited thereto. For example, the mobile stations in the present invention can be also referred to relay stations or similar variants. Accordingly, various modifications, adaptations, and combinations of various features of the described embodiments can be practiced without departing from the scope of the invention as set forth in the claims.

What is claimed is:

1. A method for providing an interference measurement result by at least one mobile station to assist a cellular orthogonal frequency division multiple access (OFDMA) system for enabling a frequency-reuse, comprising:
   (a) transmitting an interference measurement request by a mobile station to a serving base station and thereby receiving an interference measurement instruction, wherein the interference measurement instruction specifies a designated time-frequency region;
   (b) performing interference measurements by the mobile station over the designated time-frequency region and thereby obtaining an interference measurement result in the cellular OFDMA system, wherein the mobile station is located in a cell served by the serving base station; and (c) reporting the interference measurement result to the serving base station.

2. The method of claim 1, wherein the interference measurement result is derived from an interference statistic calculated from the interference measurements, and wherein the interference measurement result comprises at least one of an interference power, a signal to interference ratio (SIR), a signal to interference-plus-noise ratio (SINR), a first index indicative of an interfering base station, and a second index indicative of a radio resource region.

3. A method for providing an interference measurement result by at least one mobile station to assist a cellular orthogonal frequency division multiple access (OFDMA) system for enabling a frequency-reuse, comprising:

(a) performing interference measurements by the at least one mobile station over a time-frequency region and thereby obtaining an interference measurement result in the cellular OFDMA system, wherein the mobile station is located in a cell served by a serving base station, wherein the measuring in (a) involves measuring received signal power from one or more interfering stations over the time-frequency region, and wherein the mobile station receives no signal over the time-frequency region from the serving base station; and (b) reporting the interference measurement result to the serving base station.

4. The method of claim 1, wherein the measuring in (b) involves measuring a reference signal power from one or more interfering stations, and wherein the serving base station transmits signal over the time-frequency region.

5. The method of claim 1, wherein the measuring in (b) involves the mobile station distinguishes signal transmitted from the serving base station and signal transmitted from one or more interfering stations, and wherein the serving base station transmits signal over the time-frequency region.

6. The method of claim 2, wherein the first index comprises one or more index values that are associated with one or more precoding vectors of the interfering base station.

7. The method of claim 2, wherein the second index comprises at least one of an index value of a preferred radio resource region and an index value of a non-preferred radio resource region, wherein the preferred radio resource region is identified by having either the highest SINR or the lowest interference power, and wherein the non-preferred radio resource region is identified by having either the lowest SINR or the highest interference power.

8. The method of claim 1, wherein the time-frequency region is obtained based on radio resource allocation information broadcasted from the serving base station.

9. The method of claim 1, further comprising:

(d) receiving an interference measurement instruction from the serving base station, wherein the instruction indicates the time-frequency region.

10. A mobile station for providing an interference measurement result to assist a cellular orthogonal frequency division multiple access (OFDMA) system for enabling a frequency-reuse, comprising:

a transciever that transmits an interference measurement request to a network element and thereby receiving an interference measurement instruction, wherein the interference measurment instruction specifies a designated time-frequency region; and a measurement module that performs interference measurements and thereby obtains the interference measurement result in the cellular OFDMA system, wherein the mobile station reports the interference measurement result to the network element.

11. The mobile station of claim 10, wherein the interference measurement result is derived from an interference statistic calculated from the interference measurements, wherein the interference measurement result comprises an interference power over a designated time-frequency region.

12. The mobile station of claim 10, wherein the network element is a serving base station that serves the mobile station.

13. The mobile station of claim 12, wherein the measurment module performs interference measurements over a designated time-frequency region, and wherein the serving base station does not transmit signal over the designated time-frequency region.

14. The mobile station of claim 12, wherein the measurement module performs interference measurements over a designated time-frequency region, and wherein the measurement module further identifies at least one interference signal transmitted from a specific interfering station while the serving base station transmits signal over the designated time-frequency region.

15. The mobile station of claim 10, wherein the-interference measurement result further comprises an index value that identifies an interfering base station.

16. The method of claim 3, wherein the interference measurement result is derived from an interference statistic calculated from the interference measurements, and wherein the interference measurement result comprises at least one of an interference power, a signal to interference ratio (SIR), a signal to interference-plus-noise ratio (SINR), a first index indicative of an interfering station, and a second index indicative of a radio resource region.

17. The method of claim 3, wherein the time-frequency region is indicated by an interference measurement instruction from the serving base station.

18. The method of claim 3, wherein the time-frequency region is obtained based on radio resource allocation information broadcasted from the serving base station without receiving any interference measurement instruction from the serving base station.

19. A method for providing an interference measurement result by a mobile station to assist a cellular orthogonal frequency division multiple access (OFDMA) system for enabling a frequency-reuse, comprising:

receiving an interference measurement instruction from a serving base station;

performing interference measurements by the mobile station over a time-frequency region and thereby obtaining the interference measurement result in the cellular OFDMA system, wherein the mobile station is located in a cell served by the serving base station; and reporting the interference measurement result to the serving base station for enabling the frequency-reuse, wherein the interference measurement result is derived from an interference statistic calculated from the interference measurements, and wherein the interference measurement result comprises an interference power over the time-frequency region.

20. The method of claim 19, wherein the interference measurement result further comprises index values that are associated with one or more precoding vectors of the interfering station.

21. The method of claim 19, wherein the interference measurement result is used for adaptive frequency reuse, and wherein the frequency reuse pattern is determined by comparing the interference power with a threshold value.

22. The method of claim 19, further comprising:
transmitting an interference measurement request by the mobile station to the serving base station; and receiving the interference measurement instruction from the serving base station, wherein the interference measurement instruction indicates a designated time-frequency region.

* * * * *